Sept. 14, 1965     D. M. STEGNER     3,206,095
CONTAINER STRUCTURE

Filed Feb. 8, 1963                                      4 Sheets-Sheet 1

INVENTOR
Douglass M. Stegner
BY Jacobi & Davidson
ATTORNEYS

Sept. 14, 1965  D. M. STEGNER  3,206,095
CONTAINER STRUCTURE
Filed Feb. 8, 1963  4 Sheets-Sheet 2

INVENTOR
Douglass M. Stegner
BY Jacobi & Davidson
ATTORNEYS

Sept. 14, 1965     D. M. STEGNER     3,206,095
CONTAINER STRUCTURE

Filed Feb. 8, 1963     4 Sheets-Sheet 3

INVENTOR
Douglass M. Stegner

BY Jacobi & Davidson

ATTORNEYS

Sept. 14, 1965　　　D. M. STEGNER　　　3,206,095
CONTAINER STRUCTURE

Filed Feb. 8, 1963　　　　　　　　　　　　4 Sheets-Sheet 4

INVENTOR
Douglass M. Stegner
BY Jacobi & Davidson
ATTORNEYS

United States Patent Office 3,206,095
Patented Sept. 14, 1965

3,206,095
CONTAINER STRUCTURE
Douglass M. Stegner, Baltimore, Md., assignor to Baltimore Box Company, Baltimore, Md., a corporation of Virginia
Filed Feb. 8, 1963, Ser. No. 257,164
15 Claims. (Cl. 229—15)

The present invention pertains generally to cartons. More particularly, this invention is concerned with cartons or containers and the blanks from which they are formed, the same basically being fabricated of paperboard.

Presently, what is denominated as "corrugated paperboard" has found extensive use in the manufacture of cartons or containers, specifically for shipping purposes. The term "corrugated paperboard" encompasses what is known as "single face" corrugated stock and "double face" corrugated stock. Single face stock comprises an outer facing layer and an inner ruffled or corrugated layer fixed to the outer layer by a suitable adhesive. Double face stock comprises an outer facing layer, an inner ruffled or corrugated layer fixed thereto, and, in addition, a planar inner facing layer also fixed to the corrugated layer so that the outer and inner facing layers form, in effect, a sandwich on opposite sides of the corrugated layer.

In the existing manufacture of shipping cartons or containers, it is well known to use double face corrugated stock, as defined supra, as opposed to single face stock, and thus the use of the term "corrugated shipping" carton or container, in the following discussion and ensuing description, is intended to means a carton formed of at least "double face stock."

Having this in mind, and the fact that corrugated paperboard owes its extensive use to providing needed strength at minimum cost, corrugated shipping cartons as are presently available include many defects indigenous thereto. Thus, such cartons are difficult to fabricate and, therefore, are relatively expensive of manufacture, especially with reference to the minimal cost of corrugated paperboard. Additionally, corrugated shipping cartons as are presently known are difficult to assemble and disassemble and, thus, do not provide for ease of handling.

Of the utmost importance is the fact that such shipping cartons do not provide as fully effective a means of shipping goods as is intended. Thus, for example the shipping of various food stuffs, such as fruit, and especially bananas, presents special problems. The shipping cartons must present interiorly smooth surfaces so as not to mar the surfaces of the fruits, in which latter case, the fruit, and especially bananas, will rot. Present corrugated shipping cartons do not provide substantially completely interiorly smooth surfaces and, therefore, much of a shipment becomes waste.

Furthermore, available corrugated shipping cartons are not so constituted and arranged as to provide needed reinforcement in particular sections or portions thereof, whereby the same are not capable of withstanding the handling incurred in packing, shipping, and unpacking. Such cartons, additionally, fail to provide adequate ventilation therefor, thus further aggravating the problem of spoilage.

Having now set forth the general background in the corrugated paperboard art and the shipping cartons fabricated therefrom as are presently available, attention can be more specifically directed to the present invention which has as its primary object the provision of an improved form of corrugated paperboard carton or container which is not only free of the disadvantages listed above, but which also includes further and important advantages.

Thus, a further primary object of the present invention is the provision of a corrugated paperboard carton or container comprising an enclosure portion and a cover portion, said portions being so constituted and arranged as to provide an interior surface that is substantially completely smooth, whereby the contents thereof are free of being marred.

Another primary object of the present invention is the provision of a corrugated paperboard carton or container comprising an enclosure portion and a cover portion, each of said portions comprising, in turn, various sections that are so constituted and arranged as to reinforce one another substantially throughout, whereby a carton is provided that is reinforced and thus able to withstand rough handling during extended periods of use.

In addition to the primary objects set forth supra, the present invention has further and primary objects, namely, (a) the provision of an improved corrugated carton or container possessing a degree of strength that is at least comparable to and actually in excess of that of conventional cartons while yet maintaining the cost thereof at a minimum; (b) the provision of an improved corrugated carton or container that is unusually conveniently handled; (c) the provision of an improved corrugated carton or container that is readily assembled and disassembled by the user; (d) the provision of an improved corrugated carton or container that is easily closed and maintained in such position while yet being subject to being opened by and at the will of the user without difficulty; (e) the provision of an improved corrugated carton or container fabricated from blanks, which blanks comprise sections that are adapted to cooperate with one another in such a manner as to provide an assembled shipping carton without requiring the use of various manufacturer's joints, and; (f) the provision of an improved corrugated carton or container comprising means for adequately ventilating the same.

Still a further, yet important, and primary object of the present invention is to provide an improved form of corrugated carton or container comprising a plurality of blanks which can be comparatively easily formed on mass production type equipment, that is, which carton can be fabricated from continuous blank material. Specifically, with regard to fabrication, the present invention has as one of its primary objects the provision of a carton comprising a plurality of blanks capable of being formed by mass production techniques of a generally continuous nature whereby normal corrugating rolls and the like can be used.

Another and still further primary object of the present invention is the provision of an improved corrugated carton or container comprising an enclosure portion and a cover portion, said portions being so constituted and arranged as to present two complete compartments within a single unit, joined, yet which are so separated, that contents of the compartments cannot be damaged by shipping under or past a separating wall or separating walls therebetween.

Still further, it is an object hereof to provide such a carton wherein the compartments may be separated from one another, if desired, and used individually as complete cartons. Thus, and in accordance with the just mentioned object, an additional primary object of the present invention is to provide an improved corrugated carton or container comprising an enclosure portion and a cover portion, said portions being so constituted and arranged and including, in turn, structure permitting separation of said carton into two independently useable cartons, the same being especially useful in connection with the display of the contents thereof.

Furthermore, it is a primary object of this invention to provide an improved corrugated carton or container comprising an enclosure portion and a cover portion, the latter being so constituted and arranged as to be closeable with respect to said enclosure portion and maintained in that position without requiring external means, such as tape and the like.

Certain objects in addition to those set forth hereinabove are also of general importance, such as, for example, the provision of a carton which can readily be rendered moisture proof, and the provision of an improved carton that can be rendered insect proof.

It is to be here understood that the term "double face" corrugated stock, as used in the ensuing description, is intended to mean corrugated paperboard comprised generally of an outer facing layer, an inner facing layer, and a ruffled or undulating layer sandwiched therebetween and connected to each of the outer and inner facing layer by some suitable adhesive. However, it is further to be understood, that the present invention is not limited to double face corrugated stock as just defined, the said present invention being of such scope as to encompass corrugated stock having as many layers as is desired, the only limitation being that the extreme outer facing layer and the extreme inner facing layer be smooth, whereby the finished and assembled carton or container presents a smooth outer and inner surface for the purposes described supra.

It is further to be understood that the term "corrugated layer," "ruffled layer," or "undulating layer" as used in the ensuing description means a layer formed of ruffled or undulating paper. However, the present invention is not to be limited to a layer of paper, but rather to be considered of such scope as to encompass any layer presently available or hereinafter developed which is capable of performing the same functions as a paper layer.

Additionally, it is to be understood that the term "inner facing layer" as used in the ensuing description and appended claims refers to that layer of the blanks lying in the plane of the paper on which the attendant drawings are presented, which inner facing layer will be presented to the interior of the assembled, that is, finished, carton or container, thereby providing a carton or container that has an interiorly smooth surface.

Having in mind the above, the same is broadly achieved by providing a shipping carton fabricated of blanks having, at least, a smooth inner facing layer, said carton comprising, generally, an enclosure portion and a cover portion. The enclosure portion of said carton has a centrally disposed section, a plurality of first side sections and a plurality of end sections. Second side sections are connected to the first side sections and are adapted to be positioned with respect to said first side sections in such a manner as to retain side flaps, which are connected to said end sections and adapted to be positioned in juxtaposition with respect to said first side sections, therebetween. A means is provided for substantially locking said second side sections in position with respect to said first side sections. End flaps are provided and are connected to said second side sections in such a manner as to cooperate with said end sections in the assembled form of the container. The cover portion comprises a plurality of divider sections adapted to be positioned in back-to-back relationship with respect to one another and within said enclosure portion whereby to divide said enclosure portion into a plurality of generally similar enclosure portions. End sections are connected to said divider sections and are adapted to be positioned between said first and second side sections of said enclosure portion when the latter are in juxtaposition with respect to one another, whereby to maintain the cover portion in position with respect to said enclosure portion. A cover section is connected to each of said divider sections for enclosing an upper open end of said enclosure portions, and, for maintaining said cover sections in that position, the same are provided with frontal sections so constituted and arranged as to perform that function. The container is provided with apertures to ventilate the same and is further provided with perforations positioned generally centrally peripherally thereabout for separating the carton into two generally identical cartons.

The invention lies in the construction, arrangement, and combination of the various assemblies, parts, and components of the improved container which form the preferred embodiments of the present invention and which are described in detail hereinbelow. The description refers to the illustrative embodiments of the invention presented in the annexed drawings, wherein.

Figure 1:
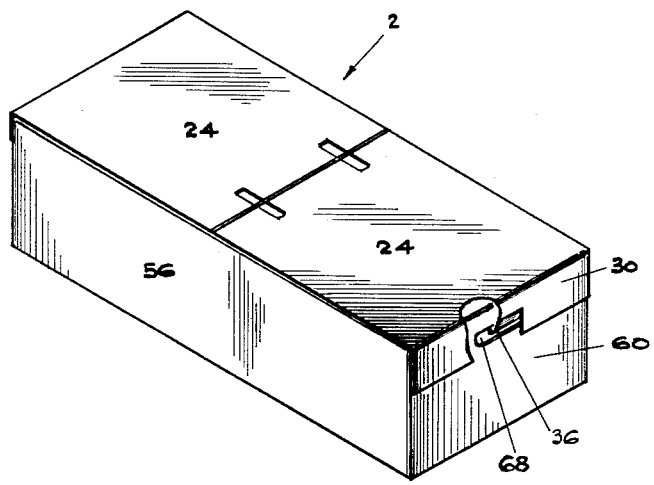
FIG. 1 is a diametric view of one form of the improved container of the present invention.

Reference is now made more specifically to the drawing for purposes of explaining the detailed aspects of the instant development.

In FIGS. 1 to 6, a corrugated paperboard carton or container constructed in accordance with the present invention and the component parts, thereof is illustrated therein. By referring to such figures, it will be noted that the carton or container is therein generally designated by the numeral 2 and is generally comprised of a cover portion 4 and an enclosure portion 6.

Figure 2:
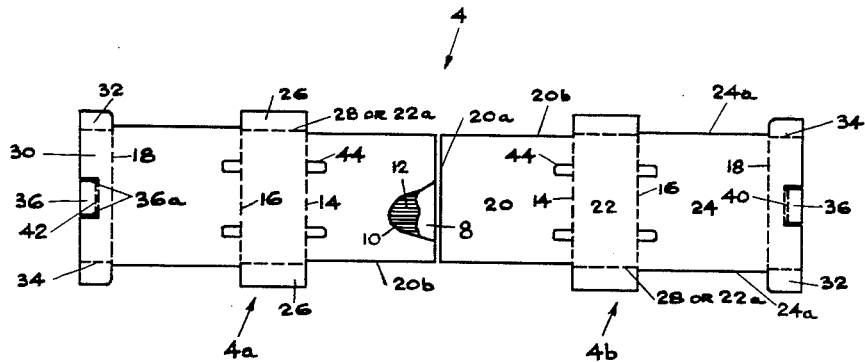
FIG. 2 is a plan view, partially in section, of the blank from which the cover portion for the container of FIG. 1 is fabricated.
Figures 3, 4:
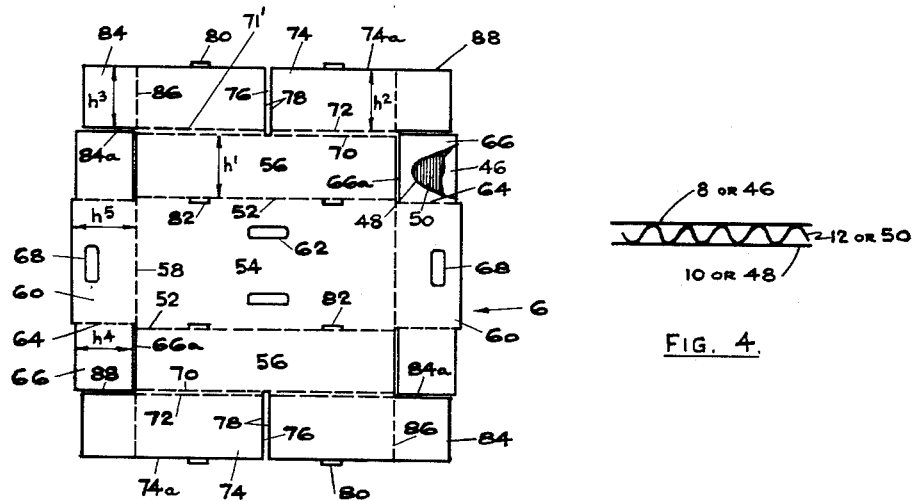
FIG. 3 is a plan view, partially in section, of the blank from which the enclosure portion for the container of FIG. 1 is fabricated.
FIG. 4 is a detail of the material from which the blanks illustrated in FIGS. 2 and 3 are formed.
Figure 7:
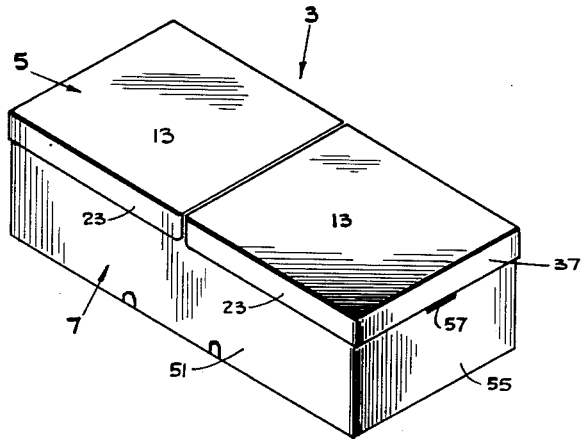
FIG. 7 is a diametric view of another form of the improved container of the present invention.
Figure 11:
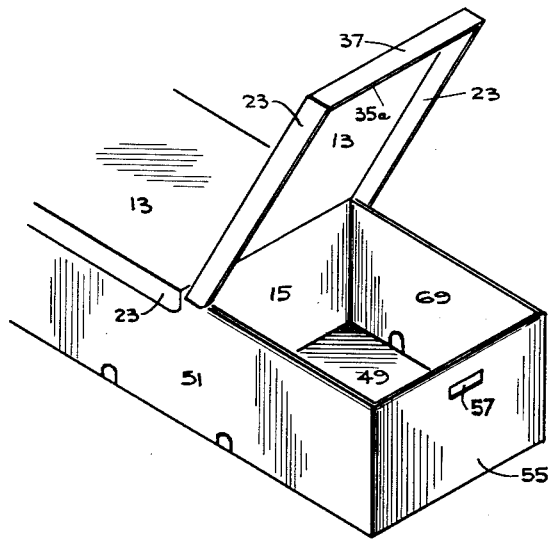
FIG. 11 is a diametric view of the container of FIG. 7 but showing a portion of the cover portion thereof in an open position with respect to the enclosure portion thereof.
Figure 8:
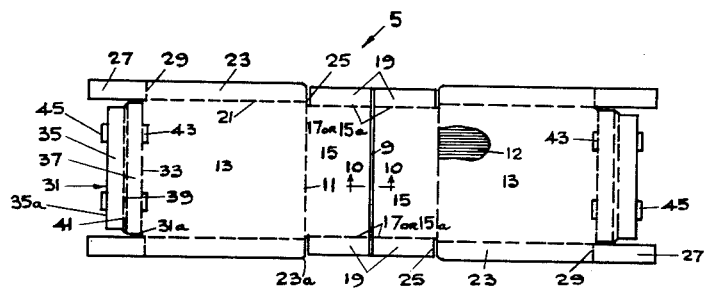
FIG. 8 is a plan view, partially in section, of the blank from which the cover portion for the container of FIG. 7 is formed.

In this embodiment of the present invention, the cover portion 4 is comprised of a plurality of generally identical cover portions, generally designated by the reference characters 4a and 4b. The cover portions 4a and 4b are preferably formed from a blank of conventional double face corrugated stock, said blank being generally rectangular in configuration. It is to be understood that the present invention encompasses forming each of the cover portions 4a and 4b individually or forming a plurality thereof simultaneously. Thus, for example, a single blank of double face corrugated stock can be so constituted and arranged as to form two cover portions, such as the cover portions 4a and 4b, simultaneously, the said single blank then being severed midway thereof to provide the two said cover portions. The corrugated stock from which the blanks are formed comprises a planar outer facing layer 8, an inner facing layer 10, and a ruffled or undulating layer 12 sandwiched therebetween, as illustrated in FIGS. 2 and 4. Any suitable adhesive can be used to secure the undulating or corrugated layer 12 to the planar outer and inner facing layers 8 and 10, respectively. Corrugating machines to make this type of basic construction are well known, and in accordance with the present invention, any such machine can be used. Suffice it to say that, generally, conventional double face corrugated paperboard stock is formed by pulling a plurality of outer layers from a corresponding number of supply rolls and the corrugated layer from another supply roll, and passing the same continuously under or over a corrugating roller.

The blank from which the cover portions 4a and 4b are formed, assuming for purposes of discussion and not limitation that each cover portion is individually fabricated, includes score lines 14 and 16 which separate the blank into a first section 22, a second section 24 and a third section 20. In the assembled form of the container 2, as will hereinafter be described, the third section 20 will be disposed at the bottom thereof and thus comprises a reinforcing, bottom or flooring section. The section 22 of the cover portion 4a will be disposed in an upstanding position in back-to-back relationship with respect to the section 22 of the other cover portion 4b and, thus, comprises a divider section for the container 2 as a whole or a backing section for generally one-half of the container. And, the section 24 will be disposed generally parallel to the section 20 and, thus, generally at approximately right angles to the upstanding divider or backing section 22, and in position to cover the upper open end of the container or carton 2, thereby comprising a cover section.

It is to be understood that, if possible, the score lines run parallel to the ruffled or corrugated layer 12 whereby the blank form which the cover portions 4a and 4b are formed, or, for that matter, the blank from which any component part of the carton or container 2 is formed, may easily be folded into its various sections.

The blank from which the cover portions 4a and 4b are formed include score lines 28 which separate the section 22 from end sections 26. It is to be noted, as will more clearly be defined hereinafter, that the end sections 26, which are particularly adapted to be folded inwardly of the section 22 (upwardly from the face of the paper), comprise a positioning means for the cover portions 4a and 4b thereby maintaining the same in position with respect to the enclosure portion 6.

The blank from which the cover portions are fabricated is further provided with a frontal section 30 which is separated from the section 24 by a score line 18. The frontal section 30, in turn, is provided with integral marginal flaps 32 separated therefrom by the score lines 34. The marginal flaps 32 are particularly adapted to be folded or turned inwardly of the frontal section 30 (upwardly from the face of the paper) and, in conjunction with the projection 36, also provided by the frontal section 30, comprise a restraining means whereby the cover portion 4 is maintained in closed position with respect to the enclosure portion 6, as will hereinafter be explained. The projections 36 are particularly adapted to be folded or turned inwardly of and backwardly upon the frontal section, the same readily being accomplished by provision of the score lines 40 and 42. It is to be understood that the distance between the score lines 40 and 42 is generally equal to the thickness of the blank from which the enclosure portion 6 is formed whereby a portion of the latter is adapted to be positioned between the frontal section 30 and the projection 36 in the assembled position of the carton or container 2, as discussed infra.

Each of the sections 20 and 24 of the blank forming the cover portion 4 of the container 2 is provided with a plurality of apertures 44, preferably rectangular in shape comprising, in conjunction with similar apertures provided in the blank forming the enclosure portion 6, a ventilation means for the container. Obviously, as many apertures as desired may be provided, the number illustrated being intended by way of example only and not by way of limitation. However, it has been found that the use of two pairs of spaced apertures disposed in longitudinal alignment on opposite sides of back section 22, and in spaced relation to each other as well as the edges 20b, as shown, provides the most satisfactory ventilation while still maintaining adequate strength properties of the cover.

Each of the cover portions 4a and 4b illustrated in FIG. 2 are identical in configuration, as should be readily apparent from the above, and, therefore, like reference characters have been and are used to indicate like parts. In the above discussion, as indicated supra, the blank forms a single cover portion 4a or 4b. However, and, again, as pointed out supra, it is within the scope of this invention to so constitute and arrange a blank whereby a plurality of cover portions 4a or 4b are fabricated simultaneously, it being necessary thereafter merely to properly sever the blank along indicated lines to provide the said plurality of cover portions. It is to be noted that FIG. 2 illustrates two cover portions in a manner whereby discussion of the assembly thereof with respect to the enclosure portion 6 will be facilitated, the said FIG. 2 being in no way intended as a limitation of the number of cover portions formed from any one or more blanks.

Referring now particularly to FIG. 3 of the drawings, the blank from which the enclosure portion 6 of the carton or container 2 is formed is illustrated therein. The enclosure portion 6, as in the instance of the cover portions 4a and/or 4b, is preferably formed from a blank of conventional double face corrugated stock, said blank being generally rectangular in configuration. The blank includes a planar outer facing layer 46, a planar inner facing layer 48 and a ruffled or undulating layer 50 sandwiched therebetween, as illustrated in FIGS. 3 and 4. Any suitable adhesive, such as a water soluble or pressure sensitive adhesive, may be used to securely position the undulating or corrugated layer 50 both to the outer facing layer 46 and the inner facing layer 48. It is to be understood that the thickness of the blank from which the enclosure portion 6 is formed is preferably generally equal to the thickness of the blank from which the cover portion 4 is formed.

The blank from which the enclosure portion 6 is formed includes score lines 52 which separate the blank into a bottom or flooring section 54 and first upwardly extending or upstanding side sections 56. It is to be understood that in the intended use of the carton or container 2, the section 54 thereof will be generally horizontally disposed and the sections 56 thereof will be generally vertically disposed. The blank further includes score lines 58 which separate the section 54 from upwardly extending or upstanding end sections 60, said end sections 60 also being generally vertically disposed in the intended use of the carton 2. The section 54 is provided with apertures 62, which apertures are adapted to cooperate with the apertures 44 provided in the blank from which the cover portion 4 is formed, thereby comprising, as pointed out supra and more fully hereinafter, a ventilation means for the carton or container 2. To this end, apertures 62 are twice the size of apertures 44.

The sections 60 include score lines 64 which separate integral marginal or side flaps 66 therefrom. It is noted that the marginal flaps 66 are particularly adapted to be turned or folded inwardly of the sections 60 (upwardly of the plane of the paper) whereby, in the assembled position of the carton 2, the flaps will be in juxtaposition with respect to the sections 56. It is further noted that the dimension of the flaps 66 in a direction extending towards the center of the section 54 is preferably less than one-half of the longitudinal dimension thereof and, additionally, is determined so that said flaps will not interfere with, that is, will not overlap, the sections 26 of the cover portion 4 when the latter is in assembled position with respect to the enclosure portion 6, as will more fully be understood infra in describing the assembly and disassembly of the container.

The blank from which the enclosure portion 6 is formed is provided with score lines 70 and 72 which separate the side sections 56 from second side sections 74. The side sections 74 are particularly adapted to be folded or turned inwardly of the side sections 56 (upwardly of the plane of the paper) whereby said sections 74 may be positioned in juxtaposition with respect to the inner facing layer of the said sections 56. Stated in other words, the sections 74 are adapted to be folded or turned in such a manner as to place the inner facing layer thereof in juxtaposition with the inner facing layer of the sections 56 when the container 2 is assembled, as will hereinafter be discussed. It is to be understood that the spacing between the score lines 70 and 72 is generally equal to the thickness of the blank from which the cover portion 4 is formed as well as the blank from which the enclosure portion 6 is formed, whichever is the greater, should it be decided that the thickness of one is to be different than the other, since the sections 26 and the flaps 66 are to be positioned between the sections 56 and 74 in the assembled condition of the container 2. It is further to be understood that the sections 74 provide a means integral with the sections 56 and thus the enclosure portion 6 for holding or retaining the flaps 66 and thus the end sections 60 in assembled position, as discussed infra. Still further, the sections 74 provide a means integral with the sections 56 and thus the enclosure portion 6 for holding or retaining the end sections 26 and thus the cover portion 4 in assembled position, as also discussed infra.

The sections 74 integrally connected to each of the sections 56 are separated from one another by a gap 76. The distance between the peripheral edges 78 of the sections 74, and, thus, the width of the gap, is generally equal to twice the thickness of the blank from which the cover portion 4 is formed, whereby the sections 22 of the cover portions 4 associated with the container 2 in the assembled condition thereof, discussed infra, will just fit between the edges 78.

Each of the sections 74 is provided with a projection or tab 80, each of which is designed and arranged to cooperate with one of a plurality of depressions 82 provided in the section 54. The depressions 82 may be formed in any suitable manner, it being understood that the same are formed, generally, merely, by crushing the corrugations of the undulating layer 50 and severing a portion of the inner facing layer 48 forming the section 54 from the remainder thereof. It is noted that the projections 80 taken in conjunction with the depressions 82 provide a detent means for positioning the sections 74 in juxtaposition with respect to the sections 56. Thus, in effect, the sections 74 are substantially locked in position thereby providing a holding or retaining means for the sections 26 and the flaps 66.

The flaps 66 which are rendered separate and independent from the sections 56 by severing the blank along the lines 66a, are rendered separate and independent from end flaps 84 by severing the blank along the lines 84a. Additionally, the flaps 84 are separated from the sections 74 by score lines 86, whereby the flaps are adapted to be folded outwardly of the sections 74 (downwardly of the plane of the paper) and, thus, in juxtaposition with respect to the inner facing layer of the sections 60 in the assembled form of the container 2. The length of the flaps 84, that is, the dimension thereof in a direction parallel with the longitudinal axis of one of the sections 74, is generally equal to no more than one-half of the longitudinal dimension of the sections 60. This is important to preclude overlapping of the flaps 84 when they are aligned with one another in end-to-end relation at one end of the container 2 in the assembled form of the carton.

To assemble the container or carton 2, the end sections or walls 60 are turned upwardly (of the plane of the paper) and the flaps 66 turned or folded inwardly. The side walls or sections 56 are then turned upwardly whereby the inner facing walls thereof are in juxtaposition with respect to the outer facing walls of the flaps 66. Two of the sections 74 located at one end of the sections 56 are folded or turned along the score lines 70 and 72 in such a manner as to place the inner facing walls thereof in juxtaposition with respect to the inner facing walls of the sections 56. The flaps 84 which are integral with the sections 74 that have just been folded are themselves folded or turned outwardly along the score lines 86 whereby the outer facing layer of said flaps 84 are placed in juxtaposition with respect to the inner facing layer of the section 60 that is adjacent thereto. The projections 80 of the two sections 74 which have been folded are positioned within their cooperating depressions 82 thus securely positioning and securely locking the sections 74 with respect to the sections 56.

The section 20 of one of the cover portions 4a or 4b is now positioned upon the bottom or generally horizontal section 54 and the enclosure portion 6 and the divider section 22 is disposed in an upstanding position with respect to section 20. The end sections 26 integrally connected to divider section 22 are folded inwardly toward the section 60 on the end of the enclosure portion adjacent the front edge 20a of section 20 (of the plane of the paper) and positioned between the sections 56 of the enclosure portion 6 and the sections 74 which have been locked in position as described supra. It is to be understood that the section 20 of the cover portion 4 which has been positioned upon the section 54, and specifically, the peripheral edge 20a thereof, abuts against the inner facing layer of the flaps 84 at the lower edge 88 thereof. Thus, the flaps 84 are securely maintained in position with respect to the end wall 60 with which they cooperate and the sections 20 of the cover portion 4 provide, in effect, a means for so retaining the flaps 84 in said position. This is of particular importance when it is realized that the projection 36, when positioned within an aperture 68 provided in each of the end walls 60, and folded along the score lines 40 and 42, is maintained in position against and in abutting relationship with respect to the inner facing layer of the end section 60, thereby substantially precluding the cover portion 4 from opening once closed.

Additionally, it is to be understood that while the detent means comprising the projections 80 and the depressions 82 are designed to effectively retain in position the sections 74, and thus the flaps 66 of the end sections 60 and the end sections 26 of the cover portions 4, it is noted that the effectiveness of the detent means is further aided by the fact that the transverse dimension of the sections 20 of the cover portion 4 is such as to place the peripheral edges 20b thereof in abutting relationship with the inner facing wall of the said sections 74.

The other cover portion 4a or 4b may now be placed in position. The section 20 thereof is placed in position along the section 54 of the enclosure portion 6 with the outer facing layer of the section 22 in back-to-back abutting relationship with respect to the outer facing layer of the section 22 of the cover portion already in position. The end section 60 at this end of the container 2 is then turned upwardly and the flaps 66 thereof turned inwardly. The end sections 26 of this cover portion, having already been turned inwardly so that the outer facing layer thereof is in juxtaposition with respect to the inner facing layer of the sections 56, the remaining sections 74 are turned or folded as described supra and the projections 80 thereof positioned within their cooperating depressions 82. In positioning the sections 74 as just described, the flaps 84 thereof are turned outwardly and positioned so that the outer facing layer thereof is in juxtaposition with respect to the inner facing layer of the end wall 60 with which they cooperate. The lower edges 88 of the flaps 84 are, as described supra in conjunction with the other flaps 84, positioned between the inner facing layer of the end wall 60 and the peripheral edges 20a of the section 20.

It is to be understood that the sections 22 are positioned in back-to-back relationship in the assembled form of the container 2, as pointed out supra. In this position, the peripheral edges 22a, which correspond to the position of the score lines 28, are positioned between the peripheral edges 78 of the sections 74 and thus within the gap 76. Again, as pointed out supra, the length of the gap is generally equal to twice the thickness of the blank from which the cover portions 4a and 4b are formed since that length will be equal to the thickness of two sections 22 when placed in back-to-back relationship with respect to one another.

As pointed out supra, the projections 36 are particularly adapted to be turned or folded along the score lines 40 and 42 so that the inner facing layer thereof is in juxtaposition with respect to the inner facing layer of the section 30. When the cover portions 4a and 4b are in position with respect to the enclosure portion 6, the projections 36 are adapted to cooperate with the apertures 68 in the sections 60 to maintain the cover portions in closed position with respect thereto. It is again important to note that, in the assembled form of the container 2, the flaps 84 of the enclosure portion 6 will abut against the projections 36 when the latter are in position within the apertures 68. There might be some tendency of the projections 36 to return to their initial unfolded position and thus tend to bend the flaps inwardly of the container. However, since, as pointed out supra, the peripheral edge 20a of each of the sections 20 abut against the lower edges 88 of the flaps 84 when the container 2 is assembled, the flaps 84 will be substantially precluded from bending towards the center of the container and thus will provide an effective means for maintaining the projections 36 in position within the apertures 68. To further aid in maintaining the cover portions 4a and 4b in closed position with respect to the enclosure portion 6, the marginal flaps 32 are positioned between the outer facing layer of the flaps 66 and the inner facing layer of the sections 56 with which they cooperate. The flaps 32 will have a relatively snug fit between the flaps 66 and sections 56 in view of the fact that the sections 74 are in abutting relationship, at their lower edges 74a, with the peripheral edges 20b of the sections 20.

In the assembled form of the container 2, it is to be understood that the apertures 44 of the cover portion 4 and the apertures 62 of the enclosure portion 6 are in alignment and thus cooperate with one another to provide an effective ventilation means for the container. It will be appreciated that if a plurality of cartons are made with apertures 44 and 62 located and spaced as shown, then when such cartons are placed in stacked relation to one another, the ventilation apertures will fall in vertical alignment, thus permitting ventilation of any lower carton through the apertures in the cartons thereabove.

Considered readily apparent from the above description is the fact that in the assembled form of the container 2, substantially all of the walls thereof are reinforced since they are of double thickness, that is, twice the thickness of the blanks from which the cover portion 4 and the enclosure portion 6 are formed. Thus, the end walls of the container are of double thickness, being comprised of the sections 60 and the cooperating flaps 84. The side walls of the container 2 are at least of double thickness, being comprised of the sections 56 and cooperating sections 74. In fact, with regard to the side walls of the container 2, throughout a substantial portion of the length thereof, the same are three times as thick as the blanks from which the cover portion 4 and enclosure portion 6 are formed since the flaps 66 and the sections 26 are positionable between the sections 56 and the sections 74. Also, the sections 22 are positioned in back-to-back relationship with respect to one another thereby providing a divider of double thickness. And, even the bottom or flooring wall of the container 2 is of double thickness, the same being comprised of the section 54 and the sections 20. Thus, it is readily apparent, and it is of the utmost importance that it be realized the container 2 is an unusually sturdy container capable of withstanding substantial punishment while yet maintaining its shape and ability to perform its intended functions.

At ths point, it is necessary to discuss certain details of fabrication of the blanks from which the cover portion 4 and the enclosure portion 6 are formed, which details are necessary in order for the cover portion and enclosure portion to effectively cooperate with one another and properly fit into position with respect to one another. Thus, with respect to the cover portion 4, it is noted that the transverse dimension of the section 20 thereof is generally equal to the distance between the score lines 72 when the sections 74 are in position whereby, in assembled form of the container 2, the peripheral edges 20b of the sections 20 abut against the lower edges 74a of the said sections 74. As a result, the transverse dimension of the section 20 is slightly less than the transverse dimension of the section 22, the dimension of the latter being generally equal to the distance between the score lines 52 whereby the peripheral edges 22a, which lie in the same plane as the outer facing layer of the sections 26, will abut the inner facing layer of the sections 56. In turn, the transverse dimension of the section 24 is generally slightly in excess of the same dimension of the section 22 and generally is equal to the distance between the outer facing layer of the sections 56 whereby, in the assembled form of the container 2, the sections 24, which form cover sections of the container, will completely enclose the upper open end thereof. It is noted, however, that the score lines 34 are positioned slightly inwardly of the peripheral edges 24a of the section 24 and generally, will lie in the same plane as the inner facing layer of the sections 56 of the enclosure portion 6 so that the flaps 32 may easily be folded or turned into position between the inner facing layer of the sections 56 and the outer facing layer of the flaps 66.

With regard to the fabrication of the enclosure portion 6, it is to be noted that the score lines 64 which separate the sections 60 from the flaps 66 are positioned slightly inwardly of the score lines 52 whereby the outer facing layer of the flaps will lie in generally the same plane as the inner facing layer of the section 56 with which they cooperate in the assembled form of the container 2. And, thus, the score lines 86 are positioned slightly inwardly of the score lines 58 so that the outer facing layer of the flaps 84 will lie in generally the same plane as the inner facing layer of the section 60 with which they cooperate. By so positioning the score lines as just mentioned, folding of the various sections of the enclosure portion 6 will be facilitated as will the fit and positioning of the various sections with respect to one another.

In the final enclosure portion of the carton, any one flap 66 is folded inwardly between adjacent sections 56 and 74. The integral gap portion 71" which lies between score lines 70 and 72 forms a top side edge on any one side of the enclosure when flap 66 is folded inwardly as aforesaid. The gap portion 71", therefore, overlies the top edge 66a of flap 66.

To provide for equal height of the sides and ends of the enclosure, the heights $h1$ and $h2$ of sections 56 and 74 are made equal to the height $h5$ of section 60. The height $h4$ of flap 66 is less than heights $h1$, $h2$ and $h5$ by an amount equal to the thickness of the blank since this thickness (layer of gap portion 71") lies on top of edge 66a in the final enclosure. The height $h3$ of flap 84 equals the heights $h1$, $h2$ and $h5$ so that flap 84 extends the entire height $h5$ of section 60, as well as half the width thereof, as explained above.

With the above arrangement, when the cover portion is inserted as explained, the edge 20a of section 20 abuts the lower edge portion of the adjacent flap 84 thereby fixing the same against section 60. The section 20 lies within the enclosure and above the bottom 54. Since height h3 equals height h5, edge 84a lies adjacent the bottom 54 so that the edge 20a of section 20 can abut adjacent the lower edge portion of the then inner side of flap 84 to maintain such flap in position.

Figure 6:
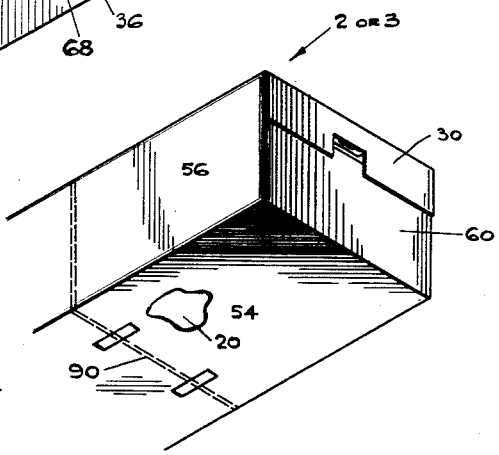
FIG. 6 is a diametric view of the container of FIGS. 1 and 7 (infra) illustrating a means for separating the container into two generally identical containers.
Figure 5:
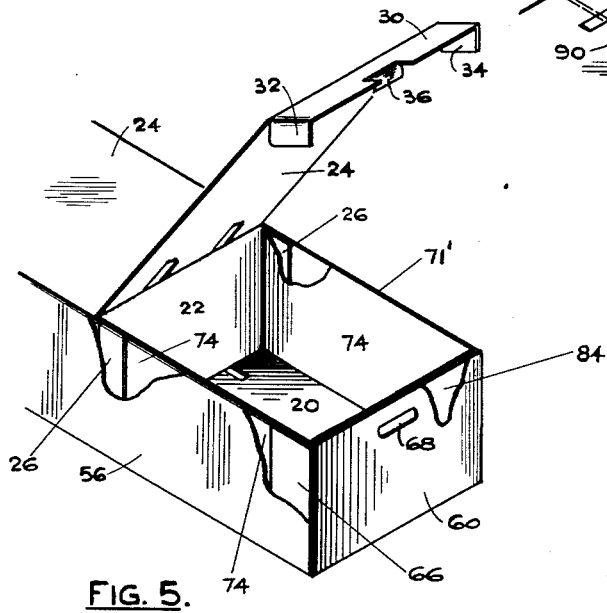
FIG. 5 is a diametric view of the container of FIG. 1 but showing a portion of the cover portion thereof in an open position with respect to the enclosure portion.

It is considered readily apparent that the container 2 is, in effect, actually two containers. This is true since the sections 22 are separate and distinct from one another when positioned in back-to-back relationship. With particular reference now to FIG. 6, perforations 90 are provided upon the enclosure portion 6 and about the periphery thereof whereby, should it be desired, and especially with reference to display of the contents within the container, the same can be separated into two containers of the same general configuration. This act can be performed with substantial ease, it being necessary merely to begin severing the perforated strip from the enclosure portion 6 by means of some handy implement, and completing its severence by hand. Once the strip 90 is completely severed, the container 2 becomes two containers, it being remembered that the sections 74 connected to any one of the sections 56 are separated from one another by means of the gap 76 and the fact that the sections 22 are completely separate and distinct from one another.

Referring now to FIGS. 7 to 12 inclusive of the drawings, a modification of the corrugated paperboard container constructed in accordance with the present invention and the component parts thereof, generally designated by the numeral 3, is illustrated therein. The carton or container 3 comprises a cover portion 5 and an enclosure portion 7.

Figure 10:
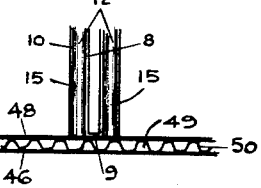
FIG. 10 is a cross-sectional detail taken along the line 10—10 of FIG. 8.

The cover portion 5 is preferably formed from a blank of conventional double face corrugated stock, said blank being generally rectangular in configuration. The blank can be constructed or fabricated in the same manner as described supra with respect to the blanks forming the cover portion 4 and the enclosure portion 6 of the container 2 and, thus, further description thereof is not deemed necessary. It will be understood, however, that the blank forming the cover portion 5 includes an outer facing layer 8, an inner facing layer 10 and a ruffled or corrugated layer 12 sandwiched therebetween, as illustrated in FIG. 10.

The blank from which the cover portion 5 is formed includes a score line 9 located centrally thereof. The inner facing layer 10 and the corrugated undulating layer 12 of the blank is severed along the line 9. Thus, with regard to the score line 9, as particularly illustrated in FIG. 10, only the outer facing layer 8 is left intact and scored to provide for folding of the blank therealong. The purpose of this will be described more fully infra.

The score line 9 divides the blank into separate but integral halves. The further score lines 11, acting with score line 9 divide the blank into a plurality of first sections 13 and a plurality of second sections 15, respective sections 13 and respective sections 15 being of equal size, the sections 13 and 15 being separated from one another by score lines 11. In the assembled form of the container 3, as will hereinafter be described, the first sections 13 will be disposed in position to enclose the upper open end of the container and thus comprise cover sections. And, in said assembled form of the container, the sections 15 will be disposed centrally thereof in a generally upstanding or vertical position and thus comprise sections for dividing the container into two equal portions. One section 15, in addition, comprises a backing or end section for that half of the container 3 with which it co-operates.

The sections 15 include score lines 17 which separate them from end sections 19. It is to be noted, as will be described further hereinafter, that the end sections 19, which are particularly adapted to be folded inwardly of the sections 15 (upwardly from the plane of the paper), comprise a positioning means for the cover portion 5 thereby maintaining the same position with respect to the enclosure portion 7.

It is noted, at this point, that, if possible, the score lines run parallel to the ruffled or corrugated layer 12 whereby the blank from which the cover portion 5 is formed, or, for that matter, the blank from which any component part of the carton or container 3 is formed, may easily be folded into its various sections.

The score line 9 is passed through the outer facing layer 8 of the blank, as well as the inner facing layer 10 and the corrugating layer 12, as pointed out supra, from a point outwardly of the juncture of this line with the score lines 17, whereby the sections 19 positioned outwardly of the score lines 17 are completely severed from one another.

The sections 13 are provided with score lines 21 whereby they are separated from lateral flaps 23. The score lines 21, it is noted, are positioned just outwardly of the score lines 17 whereby the outer facing layer of the end sections 19 will generally lie in the same plane as the inner facing layer of the sections 51 of the enclosure portion 7, as will hereinafter be described. The relative positioning of the score lines 17 and 21 also results in the inner facing layer of the flaps 23, which are adapted to be turned or folded inwardly of the sections 13 (upwardly of the plane of the paper), lying in generally the same plane as the outer facing layer of the sections 51 in the assembled form of the container 3. The flaps 23 are severed from the sections 19 along the line 25 whereby they are independent and separate from one another. The lateral flaps 23 are separated from frontal flaps 27 by score lines 29, which frontal flaps 27 are adapted to be folded inwardly of the flaps 23 (upwardly of the plane of the paper) for a purpose hereinafter to be described.

For positioning the cover portion 5 in closed relationship with the enclosure portion 7 and maintaining the cover portion in that position, the sections 13 are separated from frontal sections 31 by score lines 33. Each frontal section 31 comprises, in turn, an inner or first section 35 and an outer or second section 37, the two sections 35 and 37 being separated from one another by a plurality of score lines 39 and 41. The section 35 is adapted to be folded or turned inwardly of the section 37 (upwardly of the plane of the paper) whereby the inner facing layer of each of the sections will be in juxtaposition with respect to one another. The distance between the score lines 39 and 41 generally is equal to at least the thickness of the blank from which the cover portion 5 is formed whereby the frontal flaps 27 will fit properly between the sections 35 and 37.

It is to be understood that the frontal flaps 27 are rendered separate and distinct from the frontal sections 31 by severing or cutting the blank along the line 31a. Additionally, the first or inner section 35 of the frontal section 31 is longitudinally dimensionally smaller than that of the second or outer section 37. Stated in other words, the longitudinal dimension of the section 35 is generally equal to the distance between the inner facing layer of the lateral flaps 23 whereby, when the inner facing layer of the section 35 is positioned in juxtaposition with respect to the inner facing layer of the section 37, the section 35 will just fit between said flaps 23. Additionally, it is noted that the longitudinal dimension of the section 37 generally is equal to the distance between the outer facing layers of the lateral flaps 23 when the cover portion 5 is in assembled position as discussed infra, whereby the sections 37, and thus the frontal sections 31 cover substantially completely the ends of the container 3 in its assembled form.

It is noted that the score lines 29 which separate the lateral flaps 23 from the frontal flaps 27 are positioned slightly offset from the score lines 33, whereby the outer facing layer of the flaps 27 generally lie in the same plane as the inner facing layer of the section 37 in the assembled form of the cover portion 5. In the said assembled form, the inner facing layer of the flaps 27 will generally lie in the same plane as the inner facing layer of the section 35 when the latter is positioned in juxtaposition with respect to the inner facing layer of the section 37.

It is to be understood that the drawings are not to scale and that the distance between the lines along which the blank is severed thereby separating various section thereof are exaggerated for purposes of illustration.

The sections 13 are provided with apertures 43 which cooperate with projections 45 integrally associated with the sections 35. Thus, when the flaps 23 are folded inwardly of the sections 13 and the flaps 27 folded inwardly of the flaps 23, the sections 35 may be folded inwardly of the sections 37 positioning the sections 27 therebetween and securely holding them in said position by placing the projections 45 in the apertures 43.

The trailing peripheral edges 23a of the flaps 23 are rounded so that they present an attractive appearance when the cover portion 5 is in assembled position with respect to the enclosure portion 7 of the container 3, as will hereinafter be described.

Figure 9:
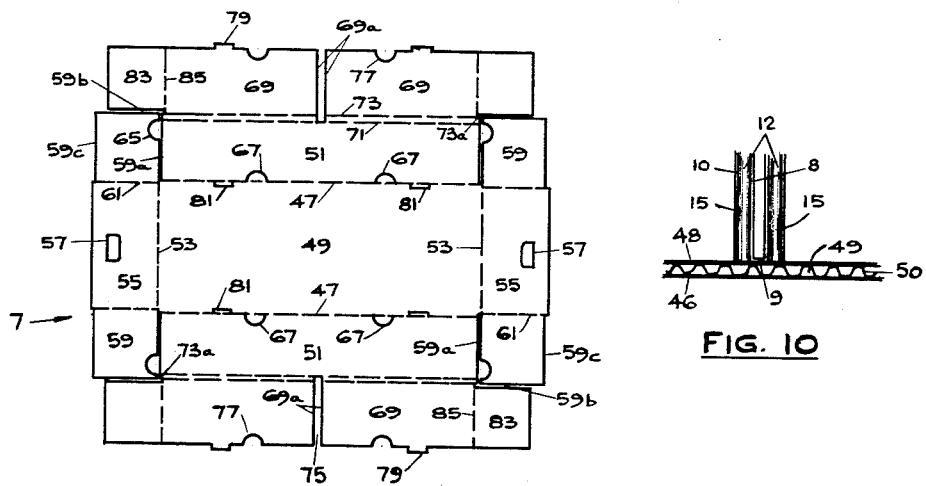
FIG. 9 is a plan view of the blank from which the enclosure portion for the container of FIG. 7 is formed.

Referring now particularly to FIG. 9 of the drawings, the blank from which the enclosure portion 7 of the container 3 is formed is illustrated therein. The enclosure portion 7 preferably is fabricated in the same manner and of the same material, namely, conventional double face corrugated stock, as the cover portion 5. It is understood that the blank from which the enclosure portion 7 is formed includes a planar outer facing layer 46, a planar inner facing layer 48 and a ruffled or undulating layer 50 sandwiched therebtween, as illustrated in FIG. 10. Any suitable adhesive, such as a water soluble or pressure sensitive adhesive, may be used to securely position the undulating or corrugated layer 50 both to the outer facing layer 46 and the inner facing layer 48. The thickness of the blank from which the enclosure portion 7 is formed preferably is generally equal to the thickness of the blank from which the cover portion 5 is formed.

The blank from which the enclosure portion 7 is formed includes score lines 47 which separate the enclosure portion into a first or centrally disposed section 49 and a plurality of, in the illustrated embodiment two, first side sections 51. It is to be understood that in the intended use of the carton or container 3, the section 49 thereof will be generally horizontally disposed and the sections 51 thereof will be generally vertically disposed. Furthermore, it is to be understood that the horizontally disposed section 49 will thus constitute or comprise a bottom or flooring section. The sections 51 are particularly adapted to be folded inwardly of the section 49, that is, upwardly of the plane of the paper.

The blank further includes score lines 53 positioned to separate the section 49 from end sections 55, said end sections being particularly adapted to also be folded inwardly of the section 49 (upwardly of the plane of the paper). As is the case with the sections 51, the sections 55 will be generally vertically disposed or upstanding in the intended use of the carton or container 3. The end sections 55 include apertures 57 which may be used as a means for carrying and otherwise transporting the container.

The blank from which the enclosure portion 7 is formed is provided with score lines 71 and 73 which separate the first side sections 51 from further or second side sections 69. The side sections 69 are particularly adapted to be folded or turned inwardly of the side sections 51 (upwardly of the plane of the paper) whereby the inner facing layer of said sections may be positioned in juxaposition with respect to the inner facing layer of the sections 51. Stated in other words, the sections 69 are adapted to be folded or turned in such a manner as to place the inner facing layer thereof in juxtaposition with the inner facing layer of the sections 51 when the container 3 is assembled, as will hereinafter be discussed. It is to be understood that the spacing between the score lines 71 and 73 is generally equal to the thickness of the blank from which the enclosure portion 7 is formed, whichever is the greater, should it be desired that the thickness of one is to be different than the other, since the sections 19 of the cover portion 5 and side flaps 59, discussed infra, are to be positioned between the sections 51 and 69 in the assembled form of the container 3. It is further to be understood that the sections 69 provide a means integral with the sections 51 and thus the enclosure portion 7 for holding or retaining the flaps 59 and thus the end sections 55 in assembled position. Still further, the sections 69 provide a means integral with the sections 51 and thus the enclosure portion 7 for holding or retaining the sections 19 and thus the cover portion 5 in assembled position all as will hereinafter be described.

The blank from which the enclosure portion 7 is formed is severed whereby the side sections 69 positioned outwardly of each of the sections 51 are separated by a gap 75. The distance between the peripheral edges 69a of the sections 69, and, thus, the width of the gap, is generally equal to twice the thickness of the blank from which the cover portion 5 is formed, whereby the sections 15 of the cover portion, in their assembled back-to-back position with respect to the enclosure portion 7, discussed infra, will just fit between the said edges 69a.

Each of the sections 69 is provided with a projection or tab 79 designed and arranged to cooperate with one of a plurality of depressions 81 provided in the section 49. The depressions 81 may be formed in any suitable manner, it being understood that, generally, the same may be fabricated merely by crushing the corrugations of the undulating layer 50 and severing a portion of the inner facing layer 48 forming the sections 49 from the remainder thereof. It is noted that the projections 79 taken in conjunction with the depressions 81 provide a detent means for positioning the sections 69 in juxtaposition with respect to the sections 51. Thus, in effect, the sections 69 are substantially locked in position thereby providing, as pointed out supra, a holding or retaining means for the sections 19 of the cover portion 5 and the flaps 59, discussed infra.

The sections 55 are separated from side flaps 59 by score lines 61. It is noted that the side flaps 59 are particularly adapted to be turned or folded inwardly of the sections 55 (upwardly of the plane of the paper) whereby, in the assembled form of the container 3, the outer facing layer of the flaps will be in juxtaposition with respect to the inner facing layer of the sections 51. It is further noted that the dimension of the flaps 59 in a direction extending towards the center of the section 49 is preferably less than one-half of the longitudinal dimension thereof and, additionally, is determined so that said flaps will not interfere with, that is, will not overlap, the sections 19 of the cover portion 5 when the latter is in assembled position with respect to the enclosure portion 7, as will more fully be understood infra in describing the assembly and disassembly of the container.

The side flaps 59 are rendered separate and distinct from the sections 51 by severing the blank from which the enclosure portion is formed along the line 59a. Additionally, the side flaps 59 are rendered independent and distinct from end flaps 83 by severing the blank along the lines 59b. The end flaps 83, in turn, are separated from the sections 69 by the score line 85, it being noted that the end flaps 83 are particularly adapted to be folded outwardly of the sections 69 (downwardly of the plane of the paper), whereby the outer facing layer of the flaps 83 is positionable with respect to the inner facing layer of the sections 55 in the assembled form of the container 3. The length of the flaps 83, that is, the dimension thereof in a direction parallel with the longitudinal axis of one of the sections 69, is generally equal to no more than one-half of the longitudinal dimension of the sections 55. This limitation is important in order to preclude the flaps 83 which will be aligned with one another in the assembled form of the container 3 from overlapping one another.

It is to be noted that the sections 51 include cut-outs 67, the sections 69 include cut-outs 77 and the side flaps 59 comprise cut-outs 65, all such cut-outs preferably being semi-circular in shape. The cut-outs 65, 67 and 77 are positioned on the flaps 59, sections 51 and sections 69, respectively, in such a manner as to be aligned with each other in the assembled form of the container 3. Thus, together, the cut-outs 65, 67 and 77 comprise a ventilation means for the container 3 during the use thereof. In this embodiment, side-ways ventilation is used, as opposed to vertical ventilation.

It is to be understood that the height of the end flaps 83 are generally equal to the sections 69. However, it is to be further understood that the height of the flaps 83 preferably is less than the height of the flaps 59. With regard to the latter, the height thereof is less than the height of the end sections 55 by an amount generally equal to the thickness of the blank from which the enclosure portion 7 is formed. Thus, when the container 3 is assembled, the height of the flaps 59 plus the thickness of the fold between the score lines 71 and 73 which will be superimposed upon the upper edge 59c of the flaps 59 will equal the overall height of the sections 51. Thus, the container 3 will be of equal height completely peripherally thereabout.

It is to be further understood that the score line 85 which separates each of the end flaps 83 from the sections 69 is offset with respect to the line 59a towards the center of the blank from which the enclosure portion 7 is formed. The amount that the score line 85 is offset is generally equal to the thickness of the blank whereby the outer facing layer of the flaps 83 will be in substantial alignment with the inner facing layer of the sections 55 in the assembled form of the container 3. The same is true with respect to the score lines 61 with respect to the score lines 47, the result thereof being to position the outer facing layer of the flaps 59 in substantial alignment with the inner facing layer of the sections 51 in the assembled position of the container 3.

To assemble the container or carton 3 in accordance with the present invention, the end section 55 at one end of the carton is turned or folded upwardly (of the plane of the paper) and the end flaps 59 integrally connected therewith turned or folded inwardly of the container thus positioning the same in substantial alignment with the score lines 47. The side sections 51 are then turned upwardly (of the plane of the paper) along the score lines 47 whereby the inner facing walls thereof are in juxtaposition with respect to the outer facing walls of the flaps 59. The sections 69 thereof, adjacent the section 55 that has been just folded, are turned or folded along the score lines 71 and 73 so that the inner facing layer of both the sections 51 and 69 are in juxtaposition with respect to one another. The projections 79 of the sections 69 that have just been folded are positioned within their cooperating depressions 81, it being understood that the side flaps 59 are now positioned between the sections 51 and 69 and maintained in that position by the detent means 79, 81.

The cover portion 5 is now folded along the line 9 which, as indicated supra, has been severed through the inner facing layer 10 and the corrugated layer 12 thereof. In this folded position, the sections 15 of the cover portion 5 are generally back-to-back with respect to one another. One pair of the sections 19, that is, the sections 19 which are integrally connected to one only of the sections 15, is positioned between the sections 51 and 69 which have been assembled as described supra. Having assembled the container 3 to this extent, it is noted that the other pair of sections 19 are in position to be located between the remaining sections 69 and the sections 51. Thus, the other end section 55 is turned or folded upwardly (of the plane of the paper) along the score line 53 and the side flaps 59 turned or folded along the score lines 61 so that the outer facing layer of the flaps 59 are in substantial alignment with the inner facing layer of the sections 51. The remaining pair of sections 69 are folded inwardly of the sections 51 (upwardly of the plane of the paper) along the score lines 71 and 73 so that the inner facing layer of the sections 51 and 69 are in juxtaposition with respect to one another, as described supra. The projections 79 are then positioned in their cooperating depressions 81 whereby the end sections 19 and the side flaps 59 are maintained in position between the sections 51 and 69. Of course, the end flaps 83 are folded or turned outwardly of the sections 69 along the score lines 85 (downwardly of the plane of the paper), whereby they are positioned inwardly of the container 3 with their outer facing layer in juxtaposition with respect to the inner facing layer of the end section 55 with which they cooperate.

To complete assembly, the sections 23 and 27 are folded upwardly and then the sections 27 of the cover portion 5 are turned or folded inwardly (upwardly of the plane of the paper) along the score lines 29. The frontal sections 31 are then turned or folded inwardly (upwardly of the plane of the paper) along the score lines 33. The sections 35 of the sections 31 are folded along the score lines 39 and 41 in such a manner as to place the inner facing layer of both of the sections 35 and 37 in juxtaposition with respect to one another. The sections 27, having been folded, are positioned between the sections 35 and 37 and the projections 45 positioned within the apertures 43, thereby maintaining the sections 27 in their assembled position. The apertures 43 and cooperating projections 45 which form a detent means for maintaining the sections 27 in assembled position, are as easily disassembled as they are assembled, it being necessary merely to apply downward and outward pressure on the lower edge 35a of the section 35. This construction of the cover portion 5 is important when it is realized that the relative dimensions are such that the cover portion 5 will snugly fit the upper open end of the enclosure portion 7 in such a manner as to provide some frictional resistance to the cover portion 5 opening in the absence of some manual force.

It is to be understood that, as pointed out supra, the sections 15 are positioned in back-to-back relationship with respect to one another in the assembled form of the container 3. In this position, the peripheral edges 15a, which correspond to the position of the score lines 17, are positioned between the peripheral edges 69a of the sections 69 and thus within the gap 75. Again, as pointed out supra, it is noted that the width of the gap is generally equal to twice the thickness of the blank from which the cover portion 5 is formed since that width will be equal to the thickness of the two sections 15 when positioned in said back-to-back relationship. And, as also pointed out supra, the distance between the score lines 17 and the relationship of the same with respect to the score lines 21 is chosen so as to position the outer facing layer of the sections 19 in abutting relationship with the inner facing layer of the side sections 51.

It is to be further understood, as pointed out supra, that in the assembled form of the container 3, the cut-outs 65, 67 and 77 cooperate with one another to provide a means for ventilating the container 3, it being noted that the said cut-outs are so positioned upon their respective flaps and sections as to be in alignment with one another in said assembled form. Additionally, the apertures 57 provided in the end sections 55 provide a means for carrying or otherwise transporting the container from one position or location to another. Of course, the apertures provide for some additional ventilation. Still further, it is to be understood that the inner surface of the container is generally perfectly smooth whereby any tendency of the container 3 to mar the surface of the contents carried or shipped thereby is substantially, if not completely, eliminated. And, as pointed out supra with respect to the container 2, the container 3 is comprised of walls that are of double thickness and thus are reinforced: that is, the walls are equal to twice the thickness of the blanks from which the cover portion 5 and the enclosure portion 7 is formed. Thus, the end walls of the container 3 are of double thickness, being comprised of the sections 55 and the cooperating end flaps 83. The side walls of the container 3 are at least of double thickness, being comprised of the sections 51 and the cooperating sections 69. In fact, with regard to the side walls of the container 3, throughout a substantial portion of the length thereof, the same are three times as thick as the blanks from which the cover portion 5 and the enclosure portion 7 are formed since the flaps 59 of the enclosure portion and the sections 19 of the cover portion are positionable between the sections 51 and 69. Also, the sections 15 are positioned in back-to-back relationship with respect to one another thereby providing a divider of double thickness as well as an end section for each half of the container.

It is to be understood that the container 3 can easily be transformed into two separate and independent cartons. In this connection, it is considered readily apparent that the container 3 can be provided with perforations 90 positioned generally longitudinally centrally of the enclosure portion 7 and about the periphery thereof, as illustrated in FIG. 6. In the case of the container 3, however, once the enclosure portion 7 has been separated into two independent and distinct containers, it is necessary to completely sever the two back portions 15 from one another by completely severing the blank from which the cover portion 5 is formed. This is accomplished by cutting the outer facing layer 8 of the blank from which the cover portion 5 is formed along the line 9, it being remembered that the inner facing layer 10 and the corrugated layer 12 already have been severed, as pointed out supra. In this connection, it is to be understood that, though FIG. 6 of the drawings particularly illustrates the container 2, the same is also intended to illustrate that either container 2 or 3 is transformable into two containers and can thus be provided with the perforations 90.

Figure 12:
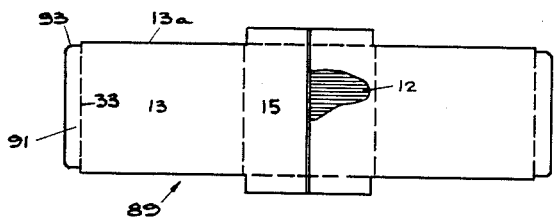
FIG. 12 is a plan view illustrating a blank from which is formed a modification of the cover portion of FIG. 8.

Referring now to FIG. 12 of the drawings, a modification of the cover portion 5, and generally indicated by the numeral 89, is illustrated therein. The cover portion 89 is fabricated in the same manner and preferably of the same material as the cover portion 5 and is, in many other respects, generally identical thereto. Thus, like reference characters indicate like parts throughout and with respect to those portions of each that are generally identical, no further description thereof, except where required for clarity, is deemed necessary.

With reference therefore to FIG. 12, the cover portion 89 comprises the sections 15 which, in the intended use of the cover portion with respect to the enclosure portion 7, will be generally vertically disposed and in back-to-back relationship with respect to one another. However, the cover portion 89 is not provided with the flaps 23 and the sections 27 and, rather than the frontal sections 31 which are adapted to cooperate with the outer facing layer of the end sections 55 of the enclosure portion 7, the cover portion 89 is provided with frontal sections 91. The frontal sections 91 are separated from the cover sections 13 by the score lines 33 whereby they are foldable or adapted to be turned upwardly (of the plane of the paper). It is noted that the frontal sections 91 are adapted to be positioned between the end sections 55 and the end flaps 83 of the enclosure portion 7 when the latter is in assembled position as discussed supra. The lateral edges 93 of the frontal sections 91 are offset inwardly of the lateral edges 13a of the sections 13 by an amount equal to the distance between the score lines 71 and 73. Thus, when the enclosure portion 7 is in assembled position, as discussed supra, the space provided for receiving the frontal sections 91 is determined by the outer facing layer of the end flaps 83 and the inner facing layer of the end sections 55 in one direction and the distance between the edges 73a provided for by folding the sections 69 inwardly and downwardly into juxtaposition with respect to the sections 51 in the other direction. Since, as pointed out supra, the lateral edges 93 of the cover sections 91 are offset by an amount equal to the distance between the score lines 71 and 73, the length of the frontal sections 91 is generally equal to the longitudinal dimension of the space for the sections 91 as determined by the distance between the edges 73a. The frontal sections 91 thus snugly fit within the space as defined supra and the frontal sections 91, when in assembled position with respect to the enclosure portion 7 of the container or carton 3, will remain in said space due to the frictional resistance against removal provided by the snug fit. The width of the cover sections 13 are generally equal to the distance between the score lines 71 whereby, when the cover portion is in assembled position, the same will completely cover the upper open end of the container to the extent of the peripheral extremities thereof as defined by said score lines.

It is to be understood that, in accordance with the concept of the present invention, any of the modifications thereof as discussed supra may be renderd moisture proof and/or insect proof. Thus, any of the blanks shown and used herein, and, thus, any of the component parts thereof, can be impregnated with a moisture resistant material, and/or a suitable insecticide or rodenticide. This is somewhat conventional, and it is believed unnecessary to describe the impregnating techniques in detail, although it is important to note that the carton provided hereby is readily susceptible to such coating.

The various modifications of the container in accordance with the present invention have been presented in connection with a generally rectangular or parallelogram container for purposes of simplicity. However, as should be readily appreciated by those of ordinary skill in the art, containers formed in accordance with the present invention can take any desired shape without departing from the scope and spirit hereof.

Moreover, it will be understood that while the invention has been discussed as applied preferably to double face corrugated paperboard stock, the same can be applied to triple face corrugated stock, combinations of double and triple face stock, or other suitable forms of corrugated stock now known or hereinafter developed, it being understood, however, that the interiorly presented surface of the carton or container is smooth whereby to preclude substantially, if not completely, any tendency of the container to mar the surfaces of the contents contained therewithin.

Although there has been no specific discussion above with respect to the matter in which the blanks can be formed automatically, it should be appreciated that a stamping operation can be readily performed to simultaneously score and cut the blanks with a single die and at a substantial production rate. Of course, other fabrication techniques can be used also, if desired.

After reading the foregoing detailed description of the preferred and illustrative cartons or containers incorporating the various embodiments of my invention, it will be understood that the objects set forth at the outset of his specification have been successfully achieved. Accordingly,

What is claimed is:

1. A carton comprising an enclosure portion having a smooth inner facing layer, said enclosure portion comprising, in turn, a centrally disposed section, a plurality of first side sections connected to said centrally disposed section, a plurality of end sections connected to said centrally disposed section, a plurality of side flaps connected to each of said end sections, said side flaps adapted to be positioned with respect to said first side sections, a plurality of second side sections connected to each of said first side sections and adapted to be positioned with respect to said first side sections in such a manner as to retain said side flaps in position therebetween, said side flaps being of less height than said end sections thereby permitting said second side sections to be positioned with respect to said first side sections, means for substantially locking said second side sections in position with respect to said first side sections, a cover portion, said cover portion including a plurality of divider sections adapted to be positioned in back-to-back relationship with respect to one another and within said enclosure portion to provide said enclosure portion into a plurality of generally similar smaller enclosure portions, a plurality of end sections connected to each of said divider sections, each of said end sections being adapted to be positioned between said first and second side sections to maintain said cover portion in position relative to said enclosure portion, a cover section connected to each of said divider sections for enclosing an upper open end of each of said enclosure portions, a reinforcing section connected to each of said divider sections, said reinforcing sections being adapted to be positioned upon said centrally disposed section for reinforcement thereof, each of said cover sections and each of said reinforcing sections having apertures therein, said centrally disposed section also having apertures therein, all of said apertures being in alignment to provide ventilation of said carton.

2. A carton as defined in claim 1 wherein a frontal section is connected to each said cover sections, said frontal section comprising a plurality of marginal flaps connected thereto, said flaps being so constituted and arranged as to be positioned between the first side sections and the side flaps of the enclosure portion, and a projection particularly adapted to cooperate with and be positioned within an aperture provided in the end sections of said enclosure portion, said projection, when in position within said aperture being positioned between the end sections and the end flaps of said enclosure portion, whereby to maintain each of the cover sections of said cover portion in closed position with respect to said enclosure portion.

3. A carton as defined in claim 2 wherein each of the reinforcing sections of said cover portion is dimensionally so constituted and arranged as to abut, in one direction, the second side sections of said enclosure portion, and abut, in another direction, the end flaps of said enclosure portion, whereby the means for substantially locking said second side sections in position with respect to said first side sections of said enclosure portion is aided by said reinforcing sections and said end flaps are maintained in position with respect to the end sections of said enclosure portion thus maintaining said projection in position between said end flaps and said end sections.

4. A carton as defined in claim 3 wherein said enclosure portion is provided with perforations positioned centrally peripherally thereabout and said second side sections connected to each of said first side sections are separated from one another by a gap, whereby said carton can be separated into two independent generally identical cartons.

5. A carton as defined in claim 4 wherein the width of said gap is generally equal to the total thickness of two divider sections when placed in back-to-back relationship with respect to one another, whereby, in the assembled form of the carton, the divider sections will just fit between said second side sections and within said gap.

6. A carton comprising an enclosure portion having a smooth inner facing layer, said enclosure portion having a centrally disposed section, a plurality of first side sections connected to said centrally disposed section, a plurality of end sections connected to said centrally disposed section, a plurality of side flaps connected to each of said end sections with said side flaps being positionable relative to said first side sections, a plurality of second side sections connected to each of said first side sections and being positionable relative to said first side sections to thereby retain said side flaps in position therebetween, means for substantially locking said second side sections in position with respect to said first side sections, a cover portion, said cover portion including a plurality of divider sections adapted to be positioned in back-to-back relationship with respect to one another and within said enclosure portion whereby to divide said enclosure portion into a plurality of generally similar enclosure portions, a plurality of end sections connected to each of said divider sections, each of said end sections adapted to be positioned between said first and second side sections to thereby maintain said cover portions in position with respect to said enclosure portion, a cover section connected to each of said divider sections for enclosing an upper open end of each of said enclosure portions, a frontal section connected to each of said cover sections, said divider sections on said cover portion being connected to one another along an edge thereof spaced from the connection between said divider sections and said cover sections, said cover section including lateral flaps connected thereto and end flaps connected to said lateral flaps, said frontal section having a first and second sections adapted to be juxtaposed to one another, said end flaps being adapted to be positioned between said first and second sections of said frontal sections, and projections connected to one of said first and second sections, said cover section having a plurality of apertures therein, said projections being positionable within said cover section apertures to thereby maintain said first and second sections in juxtaposition with respect to one another with said end flaps positioned therebetween, whereby said cover portion is adapted to be positioned about the periphery of the upper open end of said enclosure portion.

7. A carton as defined in claim 6 wherein each of said frontal sections is positionable between one of the end sections of said enclosure portion and the end flaps that are in juxtaposition with respect thereto.

8. A carton as defined in claim 6 wherein said enclosure portion is provided with perforations positioned centrally peripherally thereabout and said second side sections connected to each of said first side sections are separated from one another by a gap, whereby said carton can be separated into two independent generally identical cartons.

9. A carton as defined in claim 8 wherein the width of said gap is generally equal to the total thickness of two divider sections when placed in back-to-back relationship with respect to one another, whereby, in the assembled form of the carton, the divider sections will just fit between said second side sections and within said gap.

10. A shipping carton fabricated from a blank, said blank comprising at least an outer facing layer, a smooth inner facing layer, and a raffled layer positioned therebetween and connected to each of said outer and inner facing layers, said blank saving score lines separating a centrally disposed section from a plurality of first side sections and a plurality of end sections, a plurality of second side sections connected to each of said first sections and separated therefrom by a plurality of score lines, the distance betwen said score lines being generally on the order of the thickness of the blank, said second side sections being adapted to be folded along said plurality of said score lines into juxtaposition with respect to said first side sections, side flaps separated from said end sections by score lines and adapted to be folded therealong into juxtaposition with respect to said first side sections, said side flaps being of less height than said end sections thereby permitting said second side sections to be positioned with respect to said first side sections, and the flaps separated from said second side sections by score lines and adapted to be folded therealong into juxtaposition with respect to said end sections, said centrally disposed section being provided with a plurality of generally centrally positioned apertures, each of said first side sections being provided with a plurality of semi-circular cuttings, each of said second side sections being provided with a semi-circular cutting, and each of said end flaps being provided with a semi-circular cutting, said first and second side sections and said side flaps being disposed in juxtaposition with each other.

11. A shipping carton comprising a cover portion and an enclosure portion, said cover portion fabricated from a blank, said blank comprising at least an outer facing layer, a smooth inner facing layer, and a ruffled layer positioned therebetween and connected to each of said outer and inner facing layers, said blank having score lines separating a plurality of first sections from a plurality of second sections, said second sections being adapted to be folded along said score lines into alignment with one another but extending in opposite directions, said first sections adapted to be positioned in back-to-back relationship with respect to one another, end sections connected to said first sections and separated therefrom by score lines along which said end sections are adapted to be folded, and a frontal section connected to each of said second sections and separated therefrom by score lines along which said frontal sections are adapted to be folded.

12. A shipping carton as defined in claim 11 wherein a third section is connected to each of said first sections and separated therefrom by score lines along which said third sections are adapted to be folded, said third sections being completely separated and distinct from each other along a line midway of the distance between the score lines along which the said third sections are connected to said first sections, said third sections adapted to be folded into alignment with one another but extending in opposite directions, whereby each of said second sections is spaced from and extends in the same direction as one of said third sections.

13. A shipping carton as defined in claim 12 wherein said frontal section comprises a plurality of marginal flaps connected thereto and separated therefrom by score lines along which said marginal flaps are adapted to be folded, and a projection severed from the frontal section and adapted to be folded with respect thereto along a plurality of score lines.

14. A shipping carton as defined in claim 11 wherein said plurality of said first sections are connected to one another by one only of said outer and inner facing layers, lateral flaps connected to said sections and separated therefrom by score lines along which said flaps are adapted to be folded, and end flaps connected to said lateral flaps and separated therefrom by score lines along with said end flaps are adapted to be folded.

15. A shipping carton as defined in claim 14 wherein said frontal section comprises a first and second section separated from one another by a plurality of score lines along which said first section is adapted to be folded into juxtaposition with respect to said second section, the distance between said score lines being generally equal to the thickness of the blank whereby said end flaps are positionable between said first and second sections of said frontal section when in juxtaposition, and at least one projection on one only of said first and second sections of said frontal section cooperable with as many depressions in said second section of said blank whereby to maintain said first and second sections of said frontal section in juxtaposition with said end flaps therebetween.

References Cited by the Examiner

UNITED STATES PATENTS

| 2,167,691 | 8/39 | Shoemaker et al. | 229—44 |
| 2,425,230 | 8/47 | Cann | 229—15 |
| 2,448,795 | 9/48 | Grecco | 229—15 |
| 2,450,419 | 10/48 | Cassidy et al. | 229—15 |
| 2,471,883 | 5/49 | Miessler | 229—45 |
| 2,597,848 | 5/52 | Reeser | 229—15 |
| 2,788,932 | 4/57 | German | 229—34 |
| 2,944,723 | 7/60 | Marino et al. | 229—34 |
| 2,965,279 | 12/60 | Campbell | 229—34 |

FRANKLIN T. GARRETT, *Primary Examiner.*